UNITED STATES PATENT OFFICE.

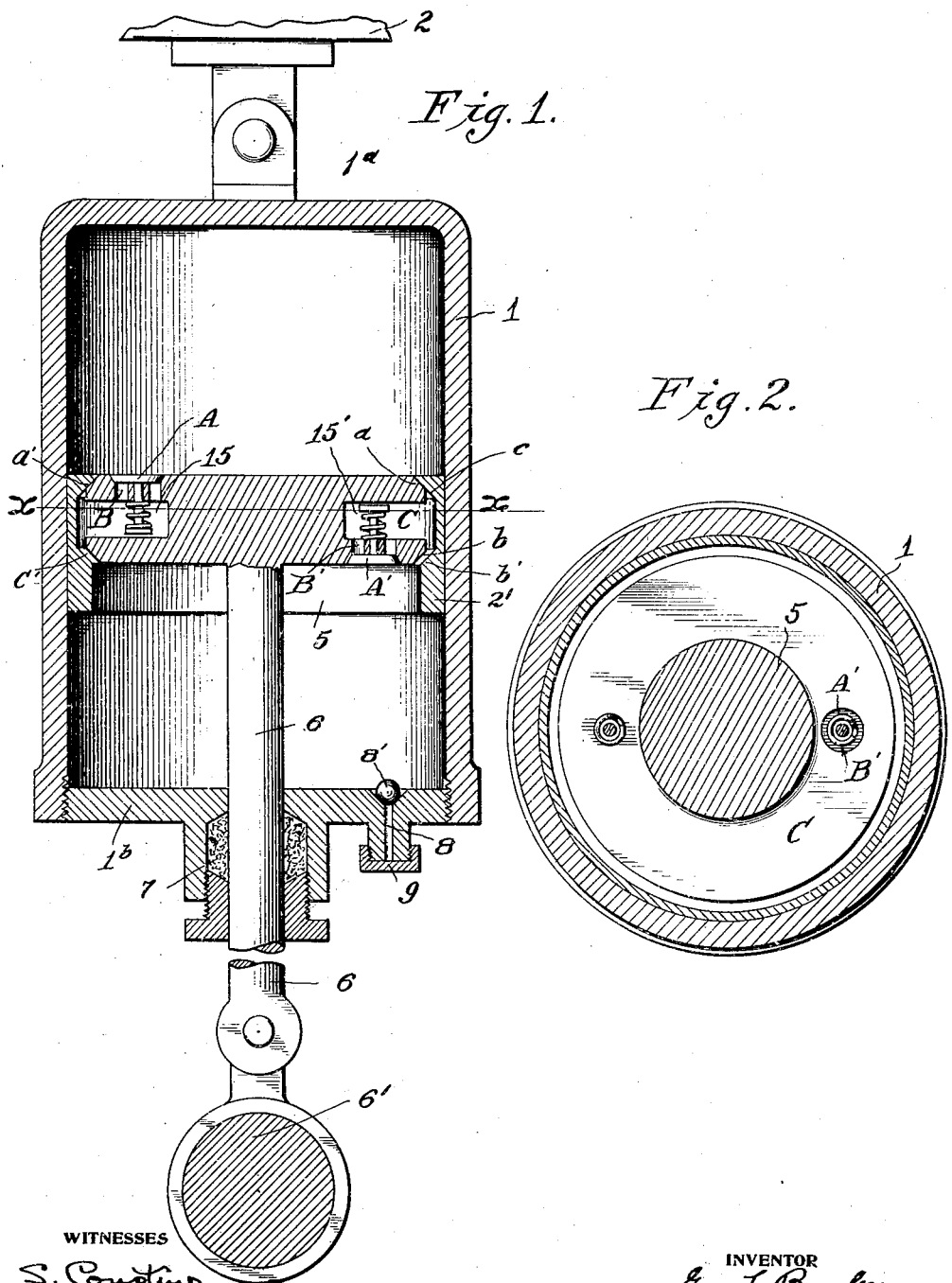

GUY L. BAYLEY, OF BERKELEY, CALIFORNIA.

SHOCK-ABSORBER.

1,062,758.  Specification of Letters Patent.  Patented May 27, 1913.

Application filed October 26, 1911. Serial No. 656,839.

*To all whom it may concern:*

Be it known that I, GUY L. BAYLEY, a citizen of the United States, residing at Berkeley, in the county of Alameda and State of California, have invented certain new and useful Improvements in Shock-Absorbers, of which the following is a specification.

This invention relates to an improved shock absorber for use mainly in connection with automobiles, and is designed to be placed between the body of a vehicle and the axles thereof for the purpose of absorbing road shocks when the wheels meet irregularities in the roadway and preventing the body from swaying up and down violently when passing over road obstacles, the improved absorber employing a suitable size cylinder provided with a piston working therein, the cylinder, in the present case, being connected to the body of the vehicle, at one corner thereof, and the stem or rod of the piston extended beyond the cylinder being attached to the axle of the car, it being understood that a plurality of shock absorbers are provided for the automobile.

In common with shock absorbers, the present absorber has for its object to compensate for the vibratory strains generated during the running of an automobile, and eliminating the jarring effect resulting therefrom being transmitted to the body of the vehicle, thereby providing for the ease and comfort of the occupants of the car.

To comprehend the invention reference should be had to the accompanying sheet of drawings, wherein—

Figure 1 is a vertical sectional view illustrating the shock absorber. Fig. 2 is a cross sectional plan view taken on line $x$—$x$, Fig. 1 of the drawings.

In the drawings, reference being had to Fig. 1 thereof, the numeral 1 designates a cylinder closed at each end thereof by the heads $1^a$ and $1^b$. This cylinder is attached in any suitable manner to the body 2 of the vehicle, preferably by a swivel connection.

A piston rod 6 extended from a piston 5 slidably mounted in the cylinder projects beyond the lower end of the cylinder 1 and by any suitable means is connected to the axle $6'$ of the vehicle, preferably by a swivel joint connection, the said piston rod working through a stuffing gland or box 7 carried by the cylinder head $1^b$.

Air is admitted into the cylinder 1 through an air inlet 8 on the head $1^b$ controlled by an upwardly opening check-valve $8'$, air entering automatically on the upstroke of the piston 5 within the cylinder 1, or the same may be forced therein by means of an air pump, not shown. A cap 9 is provided to hold the port 8 closed against the admission of air into the cylinder, when the same is not desired. In fact, after the cylinder is once supplied with air, it is only required that additional air be admitted to supply such as may be lost by leakage.

Within the cylinder 1 is located a slide cut-off $2'$, within the sphere of which the piston 5 is allowed free limited movement in either direction. The piston carries the vertically movable check-valves A and $A'$ for controlling the air valved passages B and $B'$, opening at opposite sides of the piston, said valves being held normally closed by the springs 15 and $15'$. The upper beveled edge $a$ of the piston 5 seats onto the upper beveled face $a'$ of the cut-off $2'$, while the lower beveled face $b$ of the said piston 5 seats onto the lower beveled face $b'$ of the cut-off to close respectively the passage-ways $c$ and $c'$ which passages and the valve passages B and $B'$ communicate with the circumferential passage C formed in the piston 5. In operation, on a downward movement of the vehicle body relative to the axles, the piston 5 moves upwardly relative to the cylinder 1.

During an upward movement of the piston 5 relative to the cylinder 1, the piston presses firmly against the seat $a'$ and carries with it the cut-off $2'$, the compression of the air above the piston, due to its movement, being prevented from flowing to the space below the piston by the beveled faces $a$ and $a'$ being held together and the check valve A being held to its seat by the air pressure acting against the upper face of the piston and the spring 15. On a reverse movement of the piston, the piston seats firmly on the beveled face $b'$ and the air which has been compressed above the piston flows through the open annular passage $c$ into the circumferential passage C and through the open check valve port $B'$ into the space below the piston, this flow continuing until the pressures on each side of the piston are equalized. Further movement in the reversed direction causes the air below the piston to increase in pressure, the check valve $A'$ being forced to its seat and held closed by the spring 15' and the air pressure on the lower face of the piston 5. The air within the upper portion of cylinder 1 decreases in pressure during such movement of the piston and a partial vacuum is formed therein above the said piston.

The principle of operation in connection with this form of shock-absorber is that the retarding forces co-acting with the piston of the shock-absorbers increase with the length of movement of the vehicle body relative to the axles and that at the end of the movement, if said movement is reversed in direction, either by the weight of the vehicle body or the action of the vehicle springs, the air pressures on each side of the piston are first equalized and then made to retard further movement in the reverse direction.

Having thus described the invention what is claimed as new and desired to be protected by Letters Patent is—

1. In a pneumatic shock-absorber, the combination with the cylinder thereof, of a piston movable within the cylinder, valves mounted within said piston, devices interposed between the cylinder and the piston and coacting with said valves and thrown into action by the movement of the piston for controlling the flow of air within the cylinder to first equalize the pressures on both sides of the piston and then to increase the pressure on one side of the piston and decrease the pressure on the opposite side thereof for the production of retarding forces which vary in pressure in accordance with the length of the piston's movement.

2. In a pneumatic shock-absorber, the combination with the cylinder thereof, of a piston working therein, valves mounted within said piston, a slide cut-off coacting with said valves and interposed between the cylinder and the piston and actuated by the movement of the latter for first equalizing the pressures and then permitting a compression of air on one side of the piston and creating a partial vacuum on the other side of said piston, thereby producing retarding forces opposing the movement of the piston and increasing in accordance with the stroke thereof.

3. A pneumatic shock-absorber comprising a cylinder provided with a piston working therein, a valve controlled chamber in said piston, the movement of the piston within the cylinder being opposed by the compression of air on one side thereof, and the formation of a partial vacuum on the other side of said piston, and a slide cut-off within the cylinder actuated by the movement of the piston therein, said slide cut-off coacting with the valves of said chamber for controlling the flow of air from one side of the piston to the other side, so that on a reversal of the piston's movement the air pressures on each side thereof are first equalized and then caused to generate retarding forces within the cylinder in opposition to further movement in the reverse direction.

4. A pneumatic shock-absorber comprising a cylinder, a piston working within the cylinder, oppositely disposed valve controlled openings within said piston, and a slide cut-off having a limited movement with the movement of the piston, said cut-off first releasing a portion of the air on one side of the piston and permitting the same to flow through certain of said valves to the opposite side thereof during the movement of the piston to equalize the pressures on each side thereof, and then cutting off the flow of air so that the air in advance of the piston may be compressed to increase the pressure thereof while the pressure on the opposite side is decreased and a partial vacuum formed, these retarding forces increasing in accordance with the stroke of the piston.

In testimony whereof I have signed my name to this specification in the presence of two subscribing witnesses.

GUY L. BAYLEY.

Witnesses:
N. A. ACKER,
D. B. RICHARDS.